Aug. 12, 1952  R. A. SANDBERG  2,606,458
HAND PULL BRAKE LEVER ASSEMBLY

Filed Dec. 4, 1948  2 SHEETS—SHEET 1

Inventor
Ray A. Sandberg
By The Firm of Charles K. Tibby
Attys

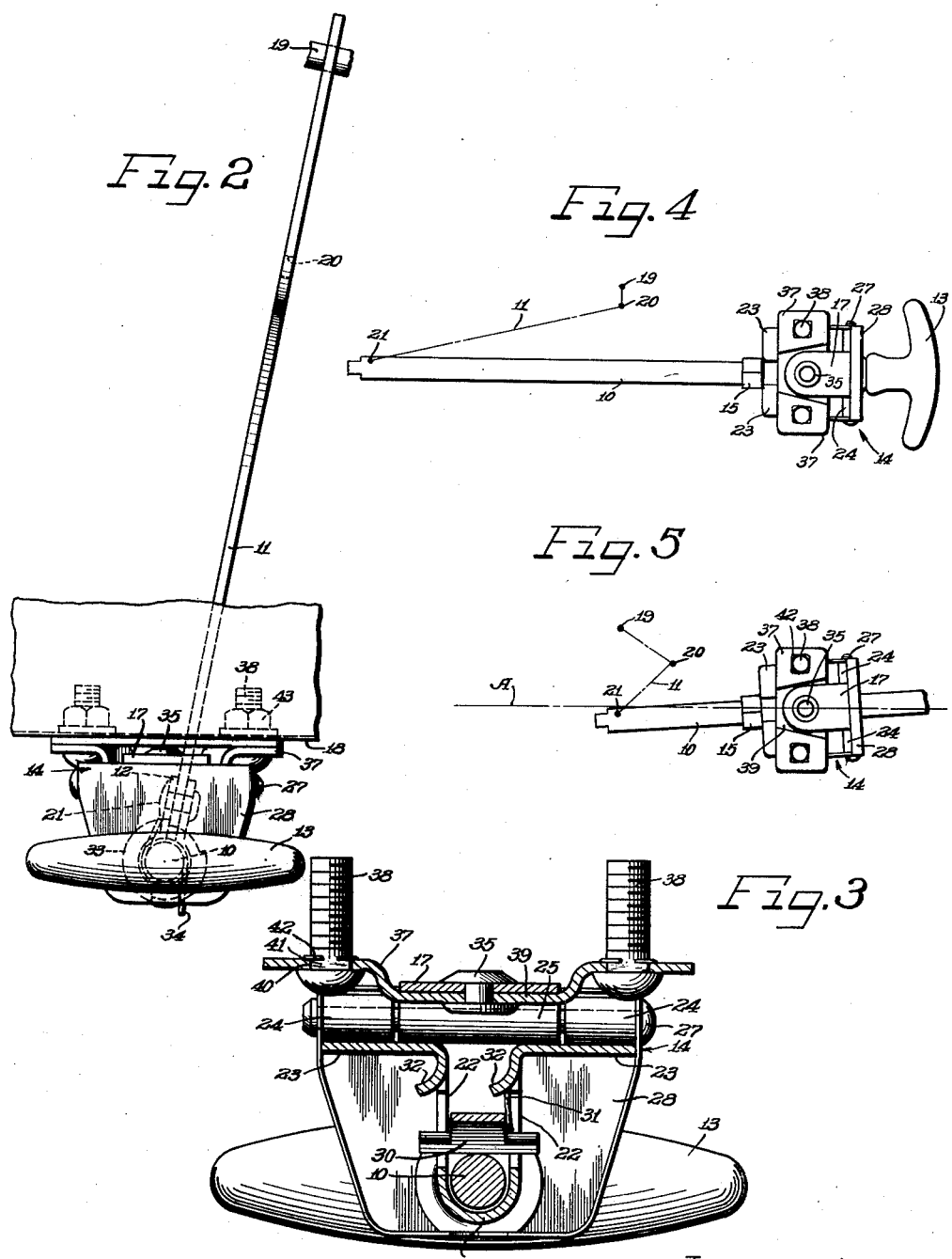

Patented Aug. 12, 1952

2,606,458

UNITED STATES PATENT OFFICE 2,606,458

HAND PULL BRAKE LEVER ASSEMBLY

Ray A. Sandberg, Waukegan, Ill., assignor to Houdaille-Hershey Corporation, Detroit, Mich., a corporation of Michigan Application December 4, 1948, Serial No. 63,529

5 Claims. (Cl. 74—503)

1

The present invention relates to improvements in hand pull brake lever assemblies and more particularly concerns brake lever assemblies of the kind which are adapted to serve as the emergency brake actuating mechanism in automotive vehicles and the like.

An important object of the present invention is to provide a hand pull brake lever assembly wherein a ratcheted pull rod controls a brake setting lever and which is especially adapted for use under conditions wherein the lever is necessarily mounted to swing in a plane which is angular to the normal swing plane of the pull rod in operation.

A further object of the invention is to provide a supporting and guiding mechanism for the pull rod of a hand pull brake lever assembly adapting the pull rod for compound swinging movement in operation.

Another object of the invention is to provide in a hand pull brake lever assembly a compound pivotal supporting mechanism for the guide means which carries the pull rod of the assembly.

Still another object of the invention is to provide a hingedly mounted brake lever device in which movement is afforded on a pivotal axis normal to the hinge axis.

Yet another object of the invention is to provide a novel hand pull brake lever assembly wherein the pull rod is substantially universally movable in operation.

Other objects, features and advantages of the present invention will be readily apparent from the following detailed description of a preferred embodiment thereof taken in conjunction with the two accompanying sheets of drawings in which:

Figure 2 is a rear elevational view of the brake lever assembly;

Figure 3 is a vertical sectional detailed view, on a large scale, taken substantially on the line III—III of Figure 1;

Figure 4 is a more or less schematic top plan view of the assembly; and

Figure 5 is a schematic top plan view of the assembly in a different operative position.

Figure 1:
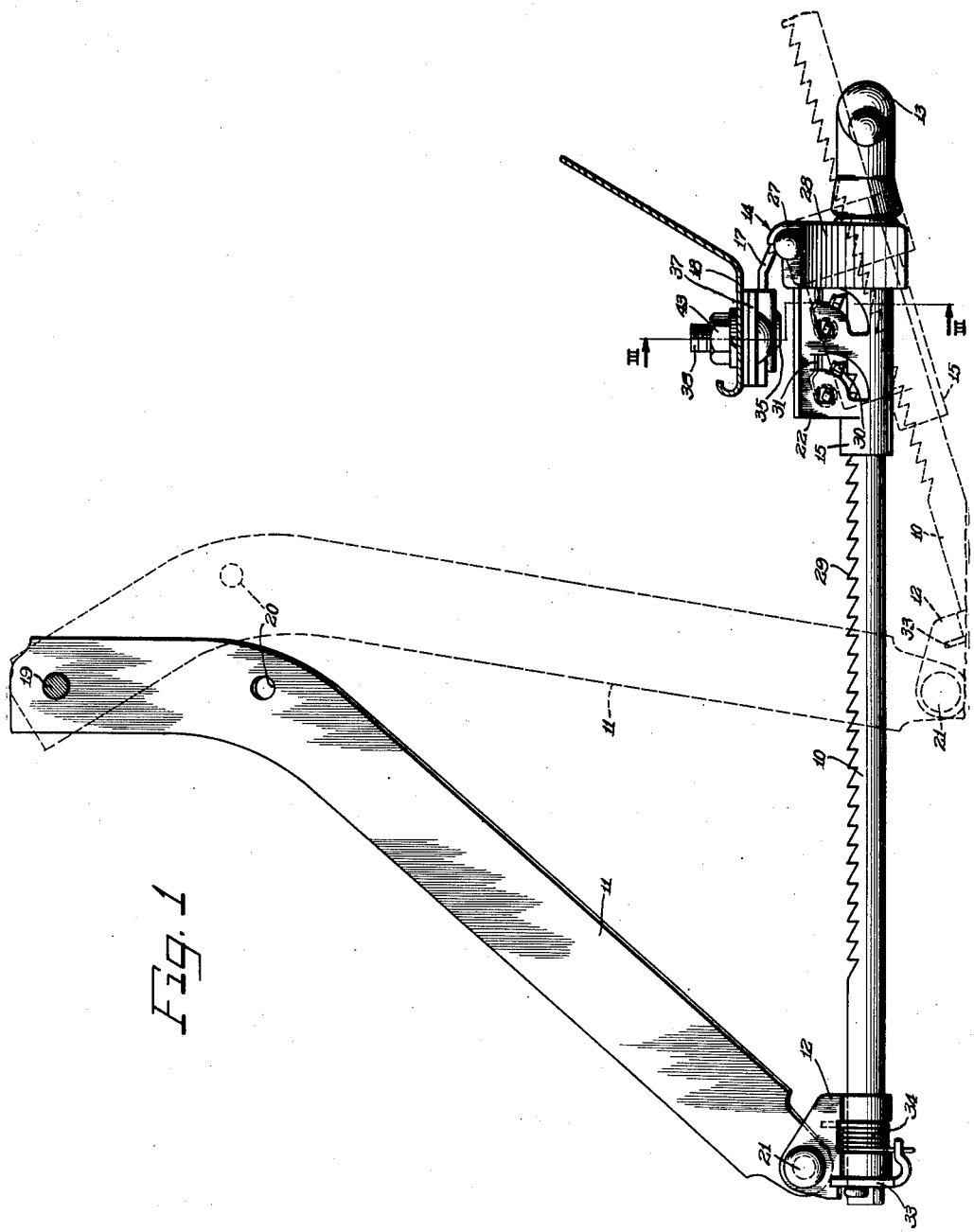
Figure 1 is a side elevational view, partially in section, of a hand pulled brake lever assembly embodying the features of the present invention.

According to the present invention, a brake lever assembly is provided which is especially adapted for manual operation and in which a ratcheted pull rod is pivotally connected to one end of a lever that is pivotally connected at its opposite end to a fixed portion of a vehicle, such as an automobile, and has a brake setting cable connected to an intermediate portion thereof, the pull rod being mounted by means of a hinged supporting structure upon another fixed portion of the vehicle with the hinge axis angularly related to the lever axis so that in the swinging of the lever in operating the brake the pull rod in addition to the usual reciprocable and rotary movements thereof and the up and down swinging movements thereof must also swing sidewise. To this end, the mechanism comprises a pull rod 10 which at its forward end is connected to one end of a brake lever 11 through the medium of means such as a clevis structure 12. At its rear end the pull rod 10 carries an actuating handle 13. Guiding and supporting mechanism 14 for the pull rod 10 comprises a guide housing member 15 which is hingedly connected to a hinge plate member 17 which in turn is adapted to be attached to a fixed part of an associated vehicle such as an instrument panel flange 18.

The lever 11 is of conventional form, having a generally dog-leg shape and with the shorter leg portion arranged to be pivotally connected as by means of a pivot pin 19 adjacent to its extremity to a relatively stationary portion of the vehicle with which the assembly is associated. Intermediate its ends, and preferably at or adjacent to the elbow portion thereof, the lever is formed with an aperture 20 for receiving a brake cable connector (not shown). The longer leg portion of the lever extends generally forwardly and has the clevis 12 pivotally connected to its extremity. It will thus be apparent that by swinging the lever 11 rearwardly powerful leverage force is applied to the brake cable connected to the lever through the medium of the connecting aperture 20. In this action, as will be observed by comparison of the full line and dash outline positions in Figure 1, as the lever 11 swings about its pivot 19 the connecting aperture 20 describes a relatively short arc of movement, while a pivot point at the opposite or forward end of the lever, and defined by a connecting pin 21 at the clevis 12, describes a relatively longer arc of movement.

Swingable actuation of the lever 11 is, of course, effected by manipulation of the pull rod 10 through the medium of its handle 13. That is, to set the brake the handle 13 is grasped and pulled rearwardly which causes the lever 11 to be swung as described for tensioning the brake cable and setting the brakes of the vehicle. As the lever 11 swings, the clevis connected at the forward end of the pull rod also necessarily swings with the attached end of the lever. To accommodate this action of the pull rod 10 while maintaining the rod in the preferred operative relation to the supporting means therefor, as the instrument panel of the vehicle, the guiding and mounting mechanism 14, and more especially the guiding member 15 thereof permits the rod to slide therethrough and also to swing as required with the lever 11. To this end, the guide member 15 comprises an essentially tubular structure within which the pull rod 10 is slidably supported for rotary and reciprocable relative movements.

Integral with the guide member 15 is a pair of spaced parallel flange or wall portions 22 each of which has a laterally extending flange portion 23. The flange portions 23 are coplanar and each formed at its forward extremity with a hinge curl 24 (Figure 3) coaxially aligned with the hinge curl of the other flange portion and with the adjacent ends spaced apart and receptive therebetween of a hinge curl 25 on the forward end of the hinge plate 17, a hinge pin 27 connecting the hinge curls pivotally. Through this arrangement, the guide member 15 is adapted to be pivotally supported by the hinge plate 17. An ornamental or escutcheon plate 28 secured to the rear end of the guide member 15 ornamentally conceals the rear end of the guide member and the hinge connection with the hinge plate 17.

In order to effect incremental brake setting and retention, the pull rod 10 is formed with a longitudinal series of ratchet teeth 29 which are engageable by half tooth increments by pawls 30 supported by the wall flanges 22 and normally yieldably urged toward ratcheting engagement with the pull rod 10 by means such as respective torsion springs 31 anchored at one end to either of a pair of struck-out spring retaining lugs 32 on the respective side wall flanges 22.

For releasing the pull rod 10 from the pawls 30, it is turned rotatably a partial turn until the pawls leave the ratchet teeth and ride upon and adjacent unratcheted longitudinal peripheral portion of the pull rod and in which released condition the pull rod can either be pushed forwardly or is pulled forwardly by the tension of the brake cable. For this purpose the pull rod is not only rotatable in the guiding member 15 but also in the clevis 12, having a thrust washer connection 33 with the clevis. A torsion spring 34 is connected between the clevis and the thrust washer 33, which is rotatably keyed with the pull rod, for normally returning the pull rod to ratcheting position after release of the brake. Thereby the brake can be set quickly merely by straight pull rearwardly on the pull rod and the pawls 30 automatically retain the pull rod in the brake setting position, and release of the brake is easily effected merely by turning the pull rod to release the pawls from the ratchet teeth.

In order to accommodate installation conditions wherein the lever axis 19 and the hinge axis 27 are necessarily in out of phase relationship, the rod supporting and guiding structure 14 is equipped to afford not only articulation between the support 18 and the pull rod 29 but also to afford means for movement of the pull rod in a plane which is out of phase with the articulation axis. To this end, the hinge plate 17 has a swivel connection through the medium of means such as a rivet type swivel pin 35 with a mounting plate 37, the latter having means for securing it fixedly to the mounting flange 18, herein comprising a pair of attachment studs 38.

By preference, the mounting plate 37 has a central depressed portion 39 upon which the forward end portion of the hinge plate 17 is slidably received to afford ample clearance within the plane of the attachment faces of the opposite end portions of the mounting plate which preferably extend laterally of the assembly and which carry the attachment studs 38 preferably fixedly. Square stud apertures 40 in the end portions of the mounting plate receive square shoulders 41 on the studs, the corners of the shoulders opposite the stud heads being peened or upset as indicated at 42 for permanently securing the studs and mounting plate together. As shown, the shanks of the studs 38 extend upwardly and attachment to the supporting flange 18 of the vehicle is effected by means such as nuts 43 threaded onto the studs.

In operation, where the brake lever assembly is mounted with the pivotal axis of the lever 11 angular relative to the hinge axis of the mounting mechanism 14, as, for example, under conditions requiring either the lever 11 to be mounted at an angle to a horizontal instrument panel supporting flange or where the instrument panel supporting flange or other support for the rod guiding and supporting mechanism is disposed angularly relative to the lever pivot axis, it is necessary for the pull rod 10 to swing in the plane of the lever 11 which is angular to the hinge axis of the rod supporting mechanism 14 so that the swinging motion of the rod is out of phase with its hinge axis. This action has been schematically illustrated in Figures 4 and 5 where it is assumed that in the fully released condition of the brake, the pull rod 10 extends on an axis normal to its hinge axis 27. As the pull rod is drawn rearwardly for setting the brake, so that the cable connection point or aperture 20 moves rearwardly of the lever axis 19, the pivotal connection 21 of the rod with the lever also moves rearwardly as the lever and rod swing together and relative to one another and with a sidewise component of movement which carries the pivot point 21 and thereby the forward end of the rod laterally of the starting axis of the pull rod identified at A in Figure 5. As this action occurs, the guide housing or member 15 swings with the rod 10 about the hinge axis 27, and also swivels relative to the mounting plate 37 about the swivel axis 35 in order to accommodate the sidewise movement of the pull rod. In order to accommodate the relative swivel movement of the hinge plate 17 with respect to the mounting plate 37, the offset recess portion 39 is preferably formed with a rearward flare in the side walls thereof to clear the sides of the hinge plate 17.

It will be observed that the swivel connection permits substantial movement of the pull rod 10 either to the left or to the right as it swings normal to its hinge axis 27, as may be necessitated in any particular installation.

Reference is made to my co-pending application, Serial No. 789,885, for features shown but not claimed herein.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in mechanism for supporting a reciprocable and rockable pull rod in a hand brake assembly, a rod guiding and supporting member, a hinge plate pivotally secured at one end to said supporting member for relative rocking movement, and an attachment plate having a centrally depressed portion within which the opposite end portion of the hinge plate is received, said depressed portion being swivelly connected to the hinge plate.

2. In combination in mechanism for reciprocably and rockably supporting a pull rod for a hand brake assembly, a rod guiding and supporting member, a pivotal support member pivotally secured adjacent to one end of the guide member and overlying the guide member, and an attachment member overlying the guide member and having a swivel connection with the pivotal supporting member on an axis normal to the pivotal axis of the support member, whereby the guide member is rockable relative to the supporting and attachment members and the guide member and the supporting member are swivelly movable relative to the attachment member.

3. In combination in a pull rod support for a brake lever assembly, a rod guiding member, an attachment member arranged to be secured fixedly to a fixed support, an elongated connecting member supporting said guide member, an offset depression in said attachment member, and a swivel pin connecting said connecting member within said depression, the side walls of the depression being flared relative to one another to afford swivel clearance for the sides of said connecting member.

4. In combination in a structure for reciprocably and rockably supporting a pull rod for a hand brake assembly, a guide housing for reciprocably and rockably supporting the pull rod, a hinge plate lying alongside the housing, means pivotally connecting one margin of the hinge plate to the housing so that the hinge plate and housing are relatively movable about the axis of the pivotal connection, means for connecting the hinge plate to a support, said last mentioned means comprising an attachment member for fixed attachment to said support, and a swivel connection of said attachment member to said hinge plate on a swivel axis normal to the axis of the pivotal connection of the hinge plate and the housing and permitting swivel movement of the hinge plate and housing assembly coincident with relative hinging movement of the hinge plate and housing, said attachment member comprising an elongated plate lying transversely to the hinge plate and swivelly connected to the hinge plate substantially centrally of the attachment plate, with means adjacent to the opposite ends of the attachment plate for connecting the same to the support.

5. In combination in a structure for reciprocably and rockably supporting a pull rod for a hand brake assembly, a pull rod connected to a brake setting lever arrange to be supported pivotally on a pivot axis disposed angularly to a supporting surface upon which the rod supporting structure must be mounted, a guide housing for reciprocably and rockably supporting the pull rod, a hinge plate lying alongside the housing, means pivotally connecting one margin of the hinge plate to the housing so that the hinge plate and housing are relatively movable about the axis of the pivotal connection, and means for connecting the hinge plate to said supporting surface with the pivotal axis of said connection parallel to said surface, said last mentioned means comprising an attachment member for fixed attachment to said supporting surface and a swivel connection of said attachment member to said hinge plate on a swivel axis normal to the axis of the pivotal connection of the hinge plate and the housing and permitting swivel movement of the hinge plate and housing assembly coincident with relative hinging movement of the hinge plate and housing as an incident to the operation of the pull rod to actuate the brake setting lever, the pivotal connection between the hinge plate and the housing being disposed at the rear margin of the hinge plate and the upper rear end portion of the housing so that the assembly is attachable underneath the supporting surface which may comprise an automobile instrument panel or the like.

RAY A. SANDBERG.

REFERENCES CITED

The following references are of record in the file of this patent:

UNITED STATES PATENTS

| Number | Name | Date |
|---|---|---|
| 543,328 | Bertels | July 23, 1895 |
| 559,951 | Rhind | May 12, 1896 |
| 597,947 | Bragger | Jan. 25, 1898 |
| 2,304,356 | Heller | Dec. 8, 1942 |
| 2,377,691 | Jandus | June 5, 1945 |

FOREIGN PATENTS

| Number | Country | Date |
|---|---|---|
| 14,666 | Great Britain | July 10, 1908 |